UNITED STATES PATENT OFFICE.

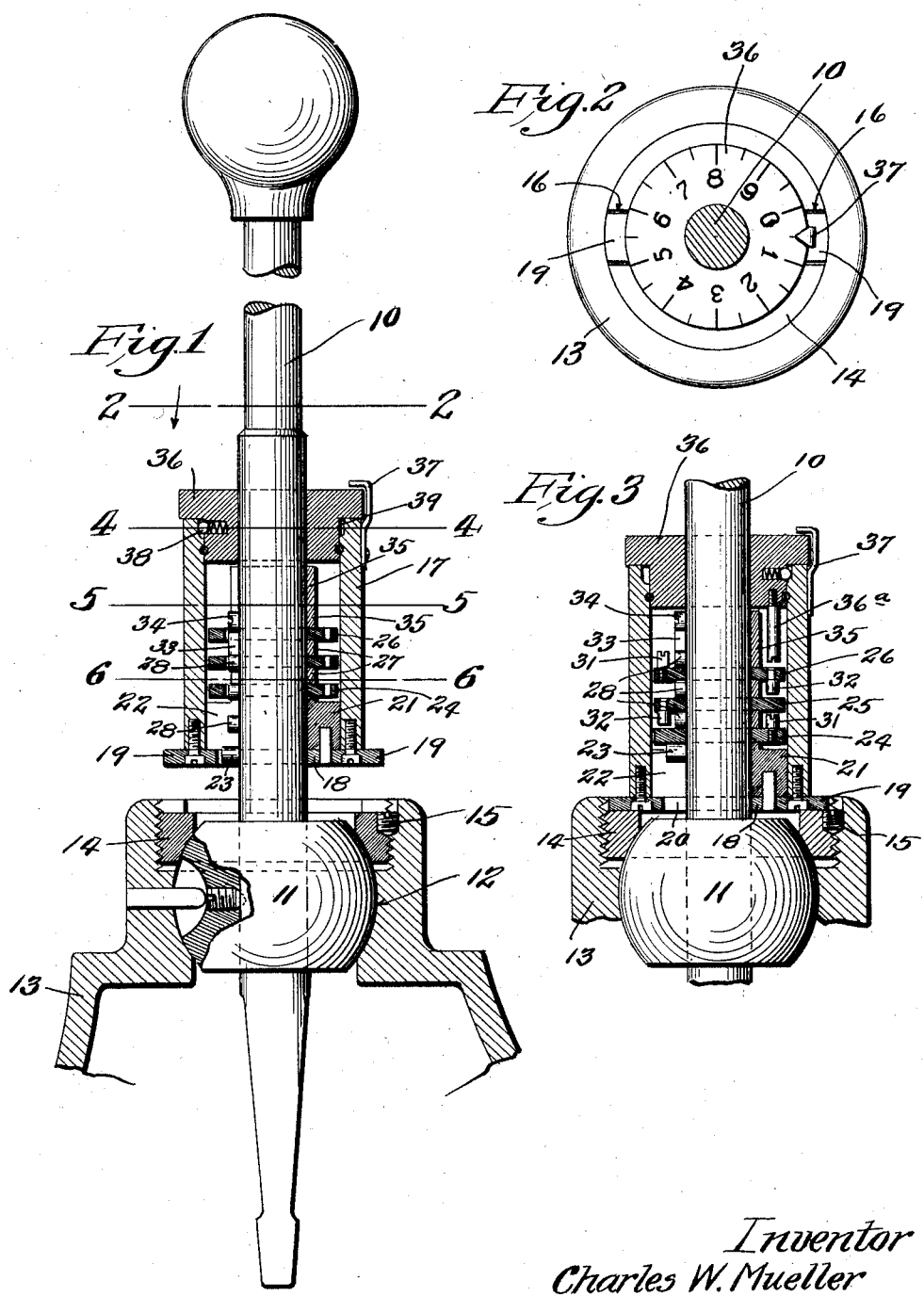

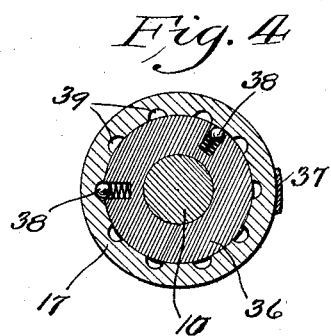
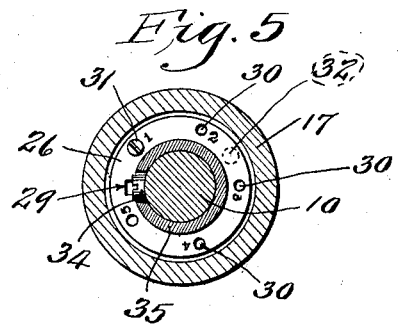
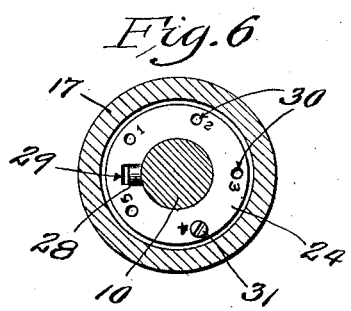
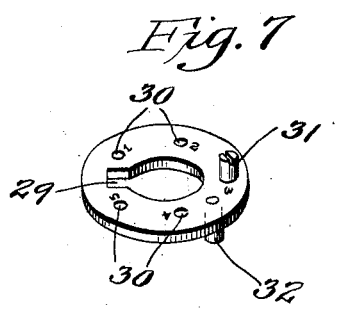
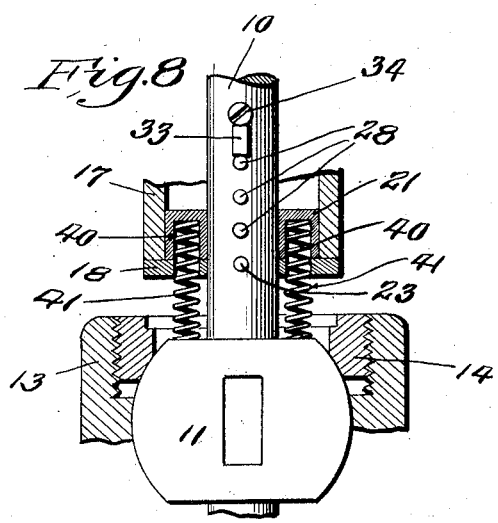
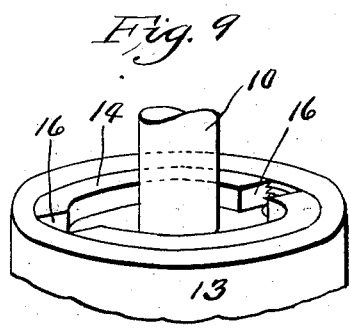

CHARLES W. MUELLER, OF ST. LOUIS, MISSOURI.

GEAR-SHIFT-LEVER LOCK FOR AUTOMOBILES.

1,389,316.　　　　Specification of Letters Patent.　　Patented Aug. 30, 1921.

Application filed February 28, 1919. Serial No. 279,845.

*To all whom it may concern:*

Be it known that I, CHARLES W. MUELLER, a citizen of the United States, residing at St. Louis, Missouri, have invented a certain new and useful Improvement in Gear-Shift-Lever Locks for Automobiles, of which the following is a full, clear, and exact description, such as will enable others skilled in the art to which it appertains to make and use the same, reference being had to the accompanying drawings, forming part of this specification.

My invention relates generally to locking mechanisms and more particularly to a lock which is directly applied to and carried by the gear shifting lever of a motor vehicle and which lock when properly manipulated will securely lock said lever in neutral position, thereby preventing said lever and the vehicle controlled thereby from being operated by unauthorized persons.

The principal objects of my invention are, to provide a relatively simple and easily operated lock of the permutation or combination type and to apply the same directly to the gear shift lever, said lock capable of being readily manipulated to unlock the lever by a person having knowledge of the proper combination; further, to provide a lock which is effective in locking the lever directly to a fixed part of the vehicle, preferably the housing for the transmission gearing; and further, to provide a lock which is very compact and which, when unlocked, in nowise interferes with the free operation of the gear shifting lever.

With the foregoing and other objects in view, my invention consists in certain novel features of construction and arrangement of parts, hereinafter more fully described and claimed, and illustrated in the accompanying drawings, in which—

Figure 1 is a vertical sectional view taken through the center of a lock of my improved construction, said lock being shown in position upon a gear shift lever, the latter being in neutral position and also showing a portion of the transmission gear casing.

Fig. 2 is a horizontal section taken approximately on the line 2—2 of Fig. 1.

Fig. 3 is a sectional view similar to Fig. 1 and showing the locking device in locked position upon the gear casing.

Fig. 4 is a horizontal section taken approximately on the line 4—4 of Fig. 1.

Fig. 5 is a horizontal section taken approximately on the line 5—5 of Fig. 1.

Fig. 6 is a horizontal section taken approximately on the line 6—6 of Fig. 1.

Fig. 7 is a perspective view of one of the permutation disks forming a part of my improved lock.

Fig. 8 is a detail section taken vertically through the lower portion of my improved lock, through the upper portion of the gear casing, and with a part of the locking lever in elevation.

Fig. 9 is a perspective view of the upper portion of the transmission gear casing with which my improved lock is associated.

Referring by numerals to the accompanying drawings, which illustrate a practical embodiment of my invention, 10 designates a gear shifting lever of the type commonly employed upon motor vehicles, said lever having a fulcrum of the usual ball and socket type, that is, the lower portion of said lever carries a substantially spherical member 11 which is arranged for operation in a socket 12 formed in the upper portion of the transmission gear casing 13.

The spherical member 11 is rigidly fixed to the lever 10 in any suitable manner and said member is retained in its socket by a ring 14 which is screw-seated in the upper portion of the gear case 13. This retaining ring is locked to the gear casing by a set screw 15 and formed in the top of said ring at diametrically opposite points are notches or recesses 16.

The housing of my improved lock comprises a short hollow cylindrical member or barrel 17 to the underside of which is secured in any suitable manner a plate 18. Projecting outwardly from said plate is a pair of oppositely arranged lugs 19 which, when the device is in locking position, occupy the recesses 16 in ring 14. Plate 18 is provided with a centrally arranged opening which receives the lever 10 and formed in said plate at one side of this opening is a relatively small aperture 20. Secured in any suitable manner to plate 18 or to the lower portion of barrel 17 and arranged within the latter is an open ring 21 between the ends of which is formed a space 22 which is equal to or slightly greater than the width of aperture 20 and said space and aperture are in direct vertical alinement with each other.

Seated in and projecting outwardly from lever 10 a short distance above spherical member 11 is a pin 23 which, when the device is unlocked, occupies aperture 20 and when said device is in locking position, said pin occupies the upper portion of space 22 as illustrated in Fig. 3.

Loosely arranged on lever 10 immediately above the ring 21 is a series of disks 24, 25, and 26, the same being spaced apart by rings 27, the latter being loosely arranged on lever 10 and having their ends spaced apart for the accommodation of a series of three pins 28 which latter are seated in lever 10 in a vertical row directly above pin 23. The length of the portions of the pins 28 which project from lever 10 is approximately half the length of the projecting portion of pin 23.

Each of the disks just described is provided to the side of the centrally arranged opening which accommodates the lever 10 with an aperture 29 which is of such size as to accommodate any one of the pins 28. Formed in each disk is a series of apertures 30, the same being arranged in a row concentric with the periphery of the disk, said apertures being threaded in order to receive the threaded lower end of an upwardly projecting pin or screw 31.

The upper disks 25 and 26 are each provided with a single depending pin such as 32, the same being arranged between a pair of the apertures 30.

Secured to lever 10 immediately above the upper one of the pins 28 is a lug 33, the width of which is equal to the diameter of said pins, and seated in lever 10 immediately above this lug is a threaded pin or screw 34, the width of the projecting portion of which is slightly greater than that of said lug 33.

Loosely arranged on lever 10 above the uppermost disk 26 is an open ring 35, the ends of which are spaced apart a sufficient distance to accommodate the pin or screw 34.

Held for rotary movement within the upper portion of barrel 17 and loosely arranged upon the lever 10 is a disk 36, the top of which is provided with a series of graduated marks terminating at the edge of said disk and said marks being provided with suitable designating characters, such as numerals or letters. Depending from the underside of this disk is a pin 36ª, the lower end of which is adapted to make contact with the pin 31 which projects upwardly from disk 26.

Secured to the upper portion of barrel 17 is a pointer 37, the upper end of which overlies the edge of disk 36, thereby serving as a guide for the movement of said disk during the unlocking operation.

The edge of disk 36 is preferably milled in order to facilitate its operation and carried by that portion of the disk which is positioned within the barrel 17 is a pair of spring-pressed balls 38 which are adapted to engage in recesses 39, the latter being formed in the inner face of the upper end of barrel 17 and said recesses being preferably arranged at equal distances apart.

The balls 38 are disposed so that when one ball occupies one of the recesses 39, the other ball occupies a position between a pair of said recesses, and by such arrangement it is possible to manipulate the disk 36 so that it will occupy any one of twenty predetermined positions with only ten of the recesses 39.

Formed through the plate 18 and in the underside of spacing ring 21 are recesses 40, the same being oppositely arranged with respect to each other and occupying said recesses are the upper portions of compression springs 41, the lower ends of the latter bearing on top of the spherical member 11. Under normal conditions, or while the gear shift lever is unlocked, these springs 41 maintain the locking device in its elevated position or in the position illustrated in Figs. 1 and 8, and when said device is so positioned, the lever can be manipulated in the usual manner to shift the gears to operate the vehicle.

To lock the lever, the same is moved to neutral position and the locking device is moved downward against the resistance offered by springs 41 until lugs 19 are engaged in the recesses 16 after which disk 36 is rotated in either direction a sufficient distance to bring pin 36ª into engagement with the pin 31 on the upper disk 26 and shift the latter so that its notch 29 is out of alinement with the adjacent pair of pins 28. Thus the opening arrangement or combination of the disks is upset or destroyed and the device will remain in locking position until properly manipulated or shifted into unlocking position.

While the lever is locked with my improved device, the parts occupy the positions illustrated in Fig. 3 with the pins 28 disposed above the disks 24, 25 and 26 and the disk 24 resting on pin 23.

To unlock the device, the person having the proper combination rotates disk 36 to bring pin 36ª into engagement with pin 31 on disk 26 and the latter will now be rotated until its depending pin 32 engages with the upwardly projecting pin carried by the next lower disk 25 and in turn, the latter will be rotated until its depending pin engages the upwardly projecting pin on lowermost disk 24 and this operation is continued until the aperture 29 in said disk 24 is in direct vertical alinement with the row of pins 28.

It will be understood that during the operations incident to the unlocking of the device, the pointer 37 and graduated marks on the top of disk 36 serve as a guide for the operator in the manipulation of said disk. After the lowermost disk 24 has thus been properly positioned with respect to the pins 28, disk 36 is rotated in a reverse direction and through the coöperating pins 36ª, 31 and 32, the disk 25 is shifted into position with its aperture 29 in vertical alinement with the pins 28 and the corresponding aperture in the lower disk 24. Disk 36 is now rotated to position the upper disk 26 so that its aperture 29 is brought into alinement with the pins 28 and the corresponding apertures of the disks 24 and 25, and when this operation has been completed, the apertures of all the disks are in alinement with each other and with the pins 28, and the springs 41 will now act to move the entire locking device upwardly or to the position illustrated in Fig. 1, whereupon the lever can be manipulated to shift gears in the usual manner. The upward movement of the locking device on the lever is limited by the engagement of the screw 34 with the upper disk 26 or to the sides of the aperture 29 therein, for, as heretofore described, the diameter of screw 34 is greater than the width of the aperture in the disk.

To change the combination, the device is taken apart and after removing screw 34, the disks 24, 25 and 26 can be separated a sufficient distance to change the positions of the screws 31, and in this connection it will be understood that by utilizing three of said disks and providing each disk with a plurality of apertures 30 adapted to receive the pins 31, a relatively large number of combinations can be arranged.

Thus it will be seen that I have produced a relatively simple device which can be readily installed on the gear shift lever of a motor vehicle, and said lever effectively locked in its neutral position, thereby preventing the engagement of any of the transmission gears of the vehicle. Even while the gear shift lever is locked, the vehicle may be moved relatively short distances by hand when it is desired to move the vehicle from place to place in a garage or repair shop. At the same time, the vehicle is effectively locked against operation from the engine power and consequently said vehicle cannot be driven by unauthorized persons.

Although the preferred form of the invention is herein described and illustrated as particularly applicable to the gear shift lever of a motor vehicle, it will be understood that the use of the device is not so restricted but that the invention may be advantageously applied to any control lever having a ball and socket fulcrum, and further, that various changes in the size, form and construction of the various parts of the lock may be resorted to without departing from the spirit of my invention, the scope of which is set forth in the appended claims.

I claim:

1. The combination of a fixed member, a lever fulcrumed therein, a lock mounted on said lever and comprising a housing slidingly mounted on said lever and held against rotation with respect to said lever, means on said housing for engaging said member to prevent movement of the lever, adjustable rings in the housing coöperating with the lever to permit longitudinal movement of the housing on the lever into and out of locking engagement therewith, a rotatable member on said housing for manipulatively operating said rings, detaining means for yieldingly holding said member in rotatable adjusted position, and means for raising said housing when said disks are arranged to permit longitudinal movement thereof, said means also preventing said housing from returning to a locking position until it is forced into such locking position.

2. In combination with a fixed member and a gear shift lever fulcrumed thereupon, a permutation lock housing carried by the gear shift lever and adapted to move into and out of engagement with the fixed member, said lock housing being provided with a recessed plate at its lower end, a ring secured to the plate and provided with a recess in alinement with the recess of the plate and of the same size as said recess, a series of spaced-apart disks provided with recesses of uniform size and slightly smaller than the recess of the plate, a ring above said disks provided with a recess of the same size as the aforesaid plate, a series of pins on the lever adapted to traverse the recesses of the disks, means for alining said recesses, a pin above said series of pins and of larger size than said pins adapted to traverse the recess in said upper ring, and a pin of the same size as said last mentioned pin adapted to traverse the recess in the lower ring.

In testimony whereof I hereunto affix my signature this 25th day of February, 1919.

CHARLES W. MUELLER.